(12) United States Patent
Jacoff

(10) Patent No.: US 6,912,793 B2
(45) Date of Patent: *Jul. 5, 2005

(54) VIAL AND METHOD OF MAKING SAME

(75) Inventor: Daniel Jacoff, Mineola, NY (US)

(73) Assignee: Great Neck Saw Manufacturers, Inc., Mineola, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/719,194

(22) Filed: Nov. 21, 2003

(65) Prior Publication Data

US 2004/0143980 A1 Jul. 29, 2004

Related U.S. Application Data

(63) Continuation of application No. 09/444,261, filed on Nov. 22, 1999, now Pat. No. 6,735,880.

(51) Int. Cl.$^7$ .............................. G01C 9/02; G01C 9/24
(52) U.S. Cl. ............................. 33/379; 33/381; 33/377; 33/37
(58) Field of Search ........................... 33/379, 381, 382, 33/383, 384, 389, 377, 365, 451; 249/67, 438, 443; 164/340, 190, 406–407, 145, 139, 312, 137

(56) References Cited

U.S. PATENT DOCUMENTS 363,998 A    5/1887  Evelyn
385,516 A    7/1888  Hutton
438,541 A    10/1890 Green
562,679 A    6/1896  Traut
871,684 A    11/1907 Foster et al.
967,258 A    8/1910  Stamm
1,101,319 A  6/1914  Neff
1,233,756 A  7/1917  Cox
1,255,744 A  2/1918  Hench
1,384,062 A  7/1921  Happle
1,578,786 A  3/1926  Weston
1,669,035 A  5/1928  Belfield
D110,980 S   8/1938  Reardon
2,362,872 A  11/1944 Weagle
2,416,887 A  3/1947  Tibbetts
2,541,215 A  2/1951  Davis
2,543,139 A  2/1951  Veit (Continued)

FOREIGN PATENT DOCUMENTS

EP    0455979   11/1991
JP    0148321   7/1986
JP    0150707   7/1990
SE    148436    10/1954
SE    148437    1/1955

Primary Examiner—Gail Verbitsky
(74) Attorney, Agent, or Firm—Joseph J. Previto

(57) ABSTRACT

A vial having an outer wall which is straight and cylindrical and a curved inner cavity. The inner cavity is curved in a substantially uniform arc. The apex of the curved cavity is closer to the cylindrical outer wall of the vial than the ends of the inner cavity. The inner cavity is substantially uniform in cross section throughout its length.

2 Claims, 4 Drawing Sheets

U.S. PATENT DOCUMENTS

| | | | |
|---|---|---|---|
| 2,615,122 A | 10/1952 | Coombs | |
| 2,627,121 A | 2/1953 | Moyer et al. | |
| 2,752,693 A | 7/1956 | Wullschleger | |
| 2,767,483 A | 10/1956 | Sauer, Jr. | |
| 2,813,349 A * | 11/1957 | Harris | 33/348 |
| 2,816,368 A | 12/1957 | Salopek, Jr. | |
| 2,854,762 A | 10/1958 | Wright | |
| 2,864,156 A | 12/1958 | Cardy | |
| 2,871,573 A | 2/1959 | Schenker | |
| 2,948,067 A | 8/1960 | Mistretta | |
| 3,018,558 A | 1/1962 | Hannan et al. | |
| 3,138,878 A | 6/1964 | Mehlman | |
| 3,190,010 A | 6/1965 | Johnson | |
| 3,192,375 A | 6/1965 | Olson | |
| 3,269,729 A | 8/1966 | Morrison | |
| 3,311,990 A | 4/1967 | Wright | |
| 3,383,772 A | 5/1968 | Gardner et al. | |
| 3,497,950 A | 3/1970 | Squire et al. | |
| 3,593,428 A * | 7/1971 | Jacoff | 33/379 |
| 3,673,696 A | 7/1972 | Wasson | |
| 3,750,301 A | 8/1973 | Johnson | |
| 3,871,109 A * | 3/1975 | Vaida | 33/379 |
| 4,271,458 A | 6/1981 | George, Jr. | |
| 4,521,974 A | 6/1985 | Neis et al. | |
| 4,655,470 A | 4/1987 | Lin | |
| 4,833,788 A | 5/1989 | Munro | |
| 5,003,699 A | 4/1991 | Wright | |
| 5,075,978 A | 12/1991 | Crowe | |
| 5,199,177 A | 4/1993 | Hutchins et al. | |
| 5,406,714 A * | 4/1995 | Baker et al. | 33/382 |
| 5,588,217 A | 12/1996 | Lindner et al. | |
| 5,595,518 A * | 1/1997 | Ours | 441/64 |
| 5,624,057 A | 4/1997 | Lifshey | |
| 5,651,186 A | 7/1997 | Lindner | |
| 5,659,967 A | 8/1997 | Dufour | |
| 5,749,152 A | 5/1998 | Goss et al. | |
| 5,755,037 A | 5/1998 | Stevens | |
| 5,755,623 A | 5/1998 | Mizenko | |
| 5,940,978 A | 8/1999 | Wright et al. | |
| 6,131,298 A | 10/2000 | McKinney et al. | |
| 6,243,957 B1 * | 6/2001 | Gruetzmacher et al. | 33/382 |
| 2001/0013175 A1 | 8/2001 | Gruetzmacher et al. | |
| 2002/0056203 A1 | 5/2002 | Gruetzmacher et al. | |
| 2002/0124425 A1 * | 9/2002 | Szumer | 33/365 |

* cited by examiner

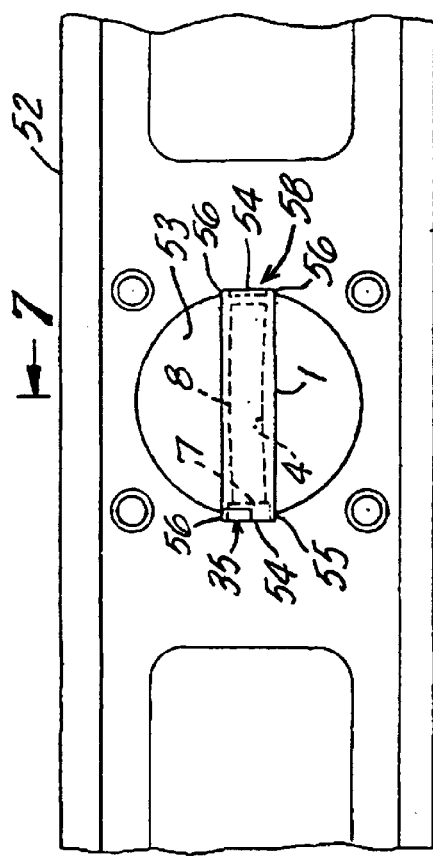
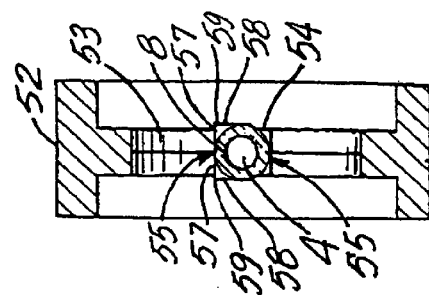
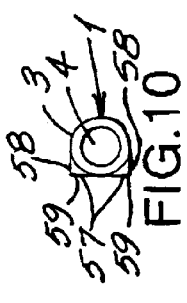
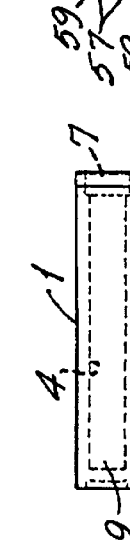
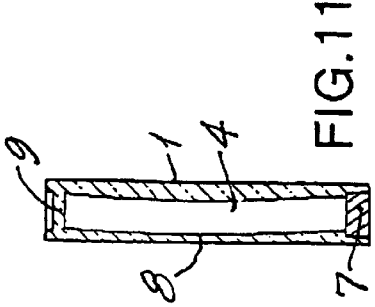

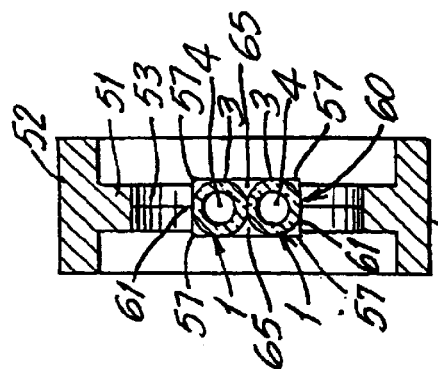
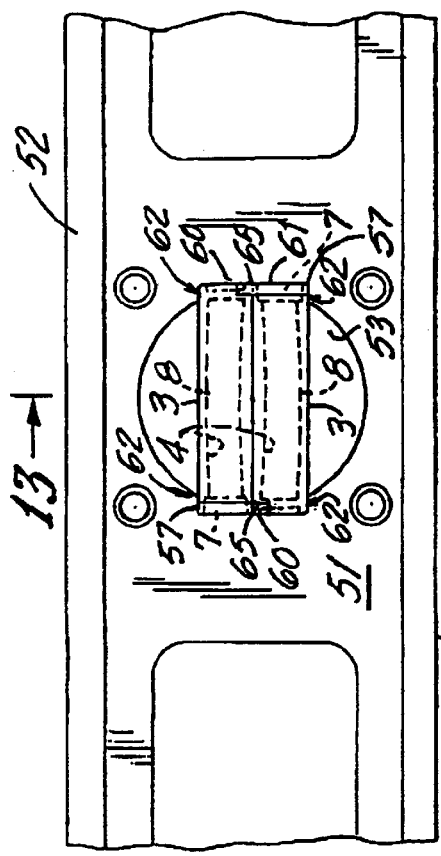
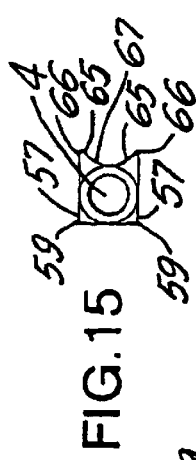
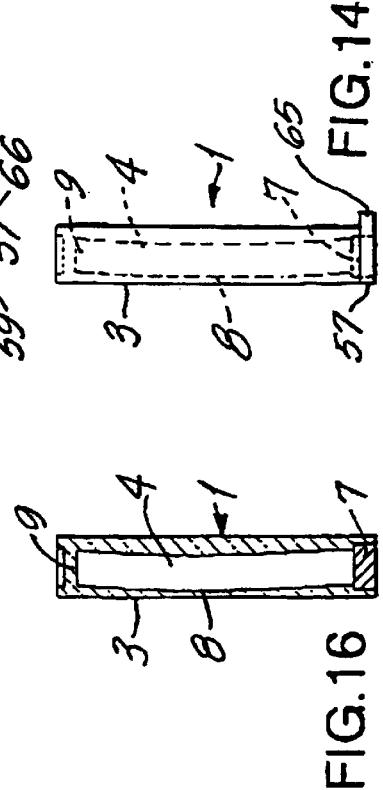

VIAL AND METHOD OF MAKING SAME

This application is a continuation of Ser. No. 09/444,261 filed Nov. 22, 1999 now U.S. Pat. No. 6,735,880.

BACKGROUND

The present invention relates to a vial and more particularly to a vial for a carpenter level. Vials are mounted in a carpenter level and comprise a transparent cylindrical tube having an inner hollow cavity. The hollow cavity is sealed at both ends and is filled almost to capacity with a liquid so that a visible bubble remains in the hollow cavity. In order to determine whether a particular surface is level (usually to the horizontal), the carpenter level is placed against the surface. If the bubble within the vial cavity moves to a central position in the vial cavity it indicates that the surface is level. If the bubble moves to one side or the other of the vial cavity center, it indicates that the surface is not level.

Ordinarily vials used for this purpose have a hollow inner cavity which is straight walled and substantially parallel to the outer cylindrical wall of the vial. An undercut is formed in the straight inner cavity into which the bubble lodges in order to give an accurate indication of whether a particular surface is level. Some existing vials are made curved so that the bubble will settle at the apex of the curve if the surface is level but will shift to an area along the edges of the curved vial if the surface is not level.

Since the vials are curved, it is especially difficult to accurately locate them in carpenter levels without precision tools. If for some reason the vials are not precisely located in a carpenter level, the instrument is not accurate. Moreover, it is important for the curved vials and the carpenter levels in which they are mounted to be consistently uniform so that accurate readings are obtained regardless of which particular level is used. These curved vials are often made of soft plastic to facilitate manufacture so that they easily scratch. In addition, existing vials are not always as sensitive as they should be so that their accuracy is compromised.

OBJECTS

The present invention overcomes these difficulties and has one of its objects the provision of an improved vial which is more accurate.

Another object of the present invention is the provision of an improved vial which has a curved fluid receiving cavity.

Another object of the present invention is the provision of an improved vial which can easily be placed accurately in a level without precision tools.

Another object of the present invention is the provision of an improved vial which eliminates the need for an internal undercut in existing straight vials.

Another object of the present invention is the provision of the improved vial which is more sensitive than existing vials.

Another object of the present invention is the provision of the improved vial which may be made from harder plastic materials thereby making the vials more resistant to scratching.

Another object of the present invention is the provision of an improved method of making a vial with a curved configuration.

Other and further objects will be obvious upon the understanding of the illustrative embodiment about to be described, or which will be indicated in the appended claims, and various advantages not referred to herein, will occur to one skilled in th e art upon employment of the invention in practice.

DRAWINGS

A preferred embodiment of the invention has been chosen for the purposes of illustration and description and is shown in the accompanying drawings forming a part of the specifications wherein.

FIG. 6 is a diagrammatic plan view showing the vial of the present invention assembled in a carpenter level.

FIG. 7 is a sectional view taken along line 7—7 of FIG. 6.

FIG. 8 is a one side view of the vial of the present invention.

FIG. 9 is another side view of the vial of the present invention.

FIG. 10 is an end view of the vial of the present invention.

FIG. 11 is a sectional view taken along line 11—11 of said FIG. 10.

FIG. 12 is a plan view of another embodiment of the present invention.

FIG. 13 is a sectional view taken along line 13—13 of FIG. 12.

FIG. 14 is a side view of the vial of this embodiment.

FIG. 15 is an end view thereof.

FIG. 16 is a sectional view thereof.

DESCRIPTION

Figure 1:
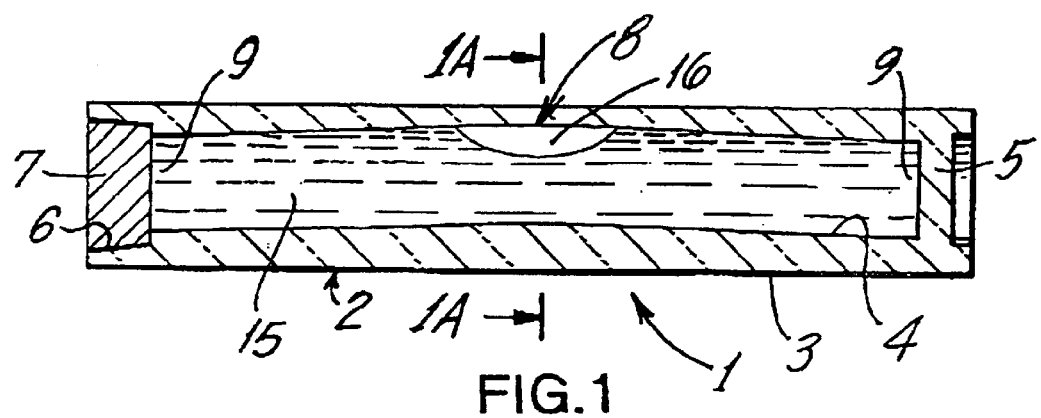
FIG. 1 is a sectional view of a vial made in accordance with the present invention.
Figure 1A:
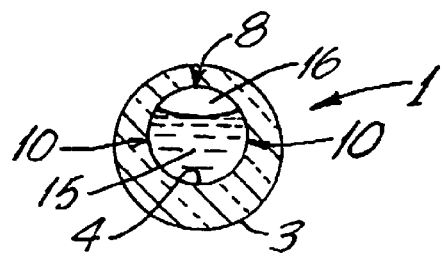
FIG. 1A is a sectional view taken along level 1A—1A of FIG. 1.

In general, the improved vial 1 of the present invention is shown in FIG. 1 and comprises a transparent body 2 having an outer cylindrical straight wall 3 and an internal hollow cavity 4. An end wall 5 is provided at one end thereof and the other end 6 is open and adapted to receive a cap 7 to seal the cavity 4. The inner hollow cavity 4 is curved with the apex 8 of the curve being higher than the ends 9. i.e. the apex 8 is closer to the outer wall 3 than its ends 9 are. The cavity 4 is in the form of a uniform arc having a substantially uniform cross section throughout its length. The cavity 4 has spaced sides 10 (FIG. 1A) at an angle of 90 degrees from the apex 8. Planes tangent to the sides 10 are parallel to each other and perpendicular to a plane tangent to the apex 8.

A liquid 15 is inserted into cavity 4 before the cavity 4 is sealed by end cap 7. The cavity 4 is not completely filled with the liquid 15 in order to leave an air bubble 16 movable within the cavity 4. The bubble 16 in the liquid 15 will assume a position at the apex 8 of the curved cavity 4 when the surface being tested is level. However, if the surface is not level, the bubble 16 will move from the apex 8 toward either end 9.

FIGS. 2 to 5 show diagrammatically the preferred method of manufacturing the vial 1 of the present invention. The mold M comprises a core pin assembly 20 having a base 21 and a core pin 22 extending from the base 21. The core pin 22 is tapered slightly at its inner portion 23 and its outer portion 24 is slightly curved. The curved outer portion 24 curved with a substantially uniform curve and terminates in a flat end 25. A stripper insert 26 having a tapered central opening 27 is mounted over the core pin 22 and rests on the base 21. The tapered opening 27 of the stripper insert 26 conforms to the tapered inner portion 23 in the core pin 22 so that it sits snugly thereon. A cavity block 30 having a central opening 31 with a straight cylindrical inner wall 32 is placed over the core pin 22 until it rests on the upper surface 28 of the stripper insert 26. The central opening 31 in the cavity block 30 is wider than the thickness of the core pin 22 so as to leave a space 33 between the core pin 22 and the inner wall 32 of the central opening 31 in the cavity block 30. A suitable plastic is injected into the cavity block opening 31 so that it fills the space 33 between the cavity block central opening 31 and the curved core pin 30. This forms the vial 1 with an outer straight cylindrical wall 3 which conforms to the straight wall 32 in the central opening 31 in the cavity block 30. However the inner cavity 4 of the vial 1 is simultaneously formed with a curve which conforms to the curvature of the curved outer portion 24 of the core pin 22. The outer end wall 5 of the vial 1 is also formed but the inner end 6 of the vial 1 remains open. The edges of the vial wall 3 adjacent the open end 6 of the vial rests on the top 28 of the stripper insert 26.

Figure 5:
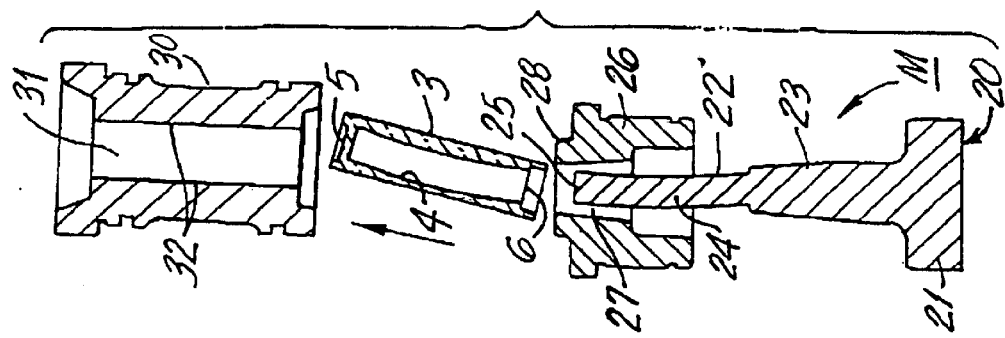
FIG. 5 is a similar view showing the last step in the manufacture of the vial of the present invention.
Figure 4:
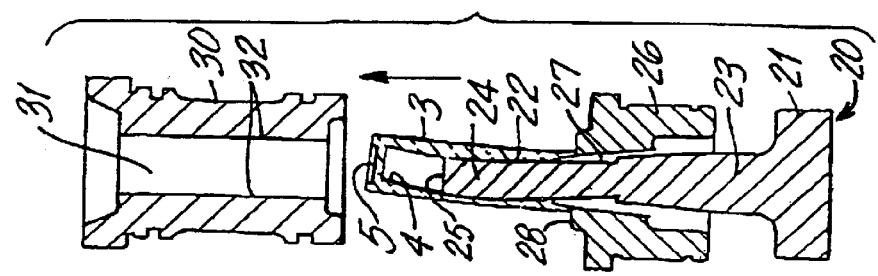
FIG. 4 is a similar view showing still another step in the manufacture of the vial of the present invention.
Figure 3:
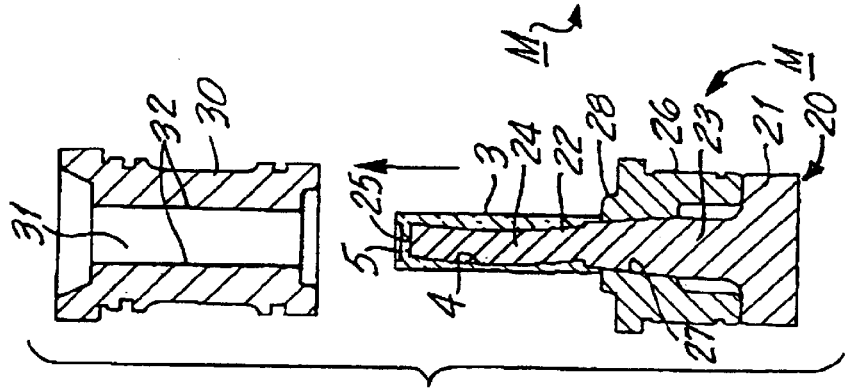
FIG. 3 is a similar view showing another step in the manufacture of the vial of the present invention.
Figure 2:
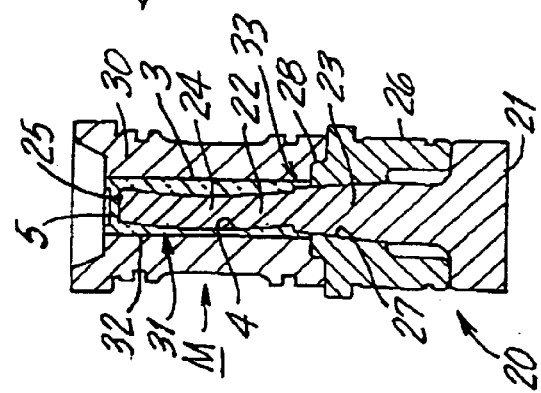
FIG. 2 is a simplified diagrammatic view showing the one step in the manufacture of the vial of the present invention.

The next step in the process is shown in FIG. 3 in which the mold M is opened and the cavity block 30 is moved away from the molded vial 1. The vial 1 is ready to be removed from the mold M and is removed from the mold (FIG. 4) by moving the stripper insert 26 upwardly in a straight line parallel to the molding direction and perpendicular to the base 21 of the core pin assembly 20 so that its upper surface 28 (on which the vial rests) pushes the vial off the core pin 22. The vial 1 will follow the curvature of the curved portion 24 of the inner core pin 22 as the vial 1 is being pushed off the core pin 22. The tapered lower portion 23 of the core pin 22 facilitates the release of the vial 1 by the insert stripper 26. As shown in FIG. 5, the last step in the process is the complete removal of the vial 1 from the core pin 22. The curved portion 24 of the core pin 22 does not interfere with the straight movement of the stripper 26 because the tapered opening 27 therein causes opening 27 to distance itself away from the core pin 22 as the insert stripper 26 is being moved up and away from the base 21. It also possible to remove the vial 1 by using a sleeve knock out (not shown) around the core pin 22 or to rotate the insert stripper 26 off the core pin 22 while following the curve of the bend 24 if larger radiuses are desired. Also, if desired, an air blow off could eject the vial 1 from the core pin 22 after it is partially lifted off the core pin 22.

With the vial 1 formed by the method set forth above it may be partially filled with liquid 15, sealed by cap 7 and mounted on a carpenter level 50 as shown in FIGS. 6 to 11. The carpenter level 50 has a body portion or web 51 connecting a pair of opposed straight parallel rails 52. A circular vial receiving opening 53 is formed in the web 51 having a pair of opposed spaced vial holding notches 54. Each notch 54 has a flat outer edge 55 and opposed flat parallel side edges 56 at right angles to edge 55. The ends 5 and 6 of the vial 1 are placed in the opposed notches 54 and held in place in any well know manner. The vial 1 is so oriented in the opening 53 that the apex 8 of the cavity 4 is closest to a rail 52, i.e. a plane tangent to the apex 8 is parallel to the rails 52. With this structure, in order to determine whether a particular surface is level, one of the rails 52 is placed against the surface and if the bubble 16 in the liquid 15 is at the apex 8 of the curved cavity 4 the surface is level - - - otherwise, the surface is not level.

In the embodiment shown FIGS. 6–11, the vial 1 is provided with a pair of keys 57 extending outwardly from one end (preferably the open end 6) of the vial 1 and in opposite direction from each other. The keys 57 have straight edge and side walls 58 and 59 tangent to the outer circular walls 3 of the vial 1 and at right angles to each other. The side walls 59 are parallel to a plane tangent to the apex of 8. Since the notches 54 in the level which receive the vial are square, by placing the keys 57 against the outer and side edges 55–56 of one of the notches 54 the vial is automatically oriented in the correct position with the apex 8 of the curved inner cavity 4 to be closest to one of the outer rails 52 i.e. a plane tangent to the apex 8 is parallel to the rails 52. When assembled in this matter, the vial 1 automatically will assume the proper orientation in the carpenter level without the necessity of using precision tools.

The embodiment shown in FIGS. 12–16 discloses a carpenter level 50 with a pair of vials 1. The carpenter level in FIG. 12 is the same as the carpenter level in FIG. 6 with the same parts referred to by the same reference characters. However, the notches 60 in opening 53 are wide enough to accommodate two vials 1 side-by-side and have a wider outer edge 61 with opposed side edges 62 at right angles to the outer edge 61. Each vial 1 has keys 57 similar to keys 57 in FIG. 6–12 extending from one side of the vial adjacent the open end 6 and curved flanges 65 extending from the other side of the open end 6. The curved flanges 65 extend in opposite directions from each other and opposite to the direction of the keys 57. Each flange 65 has a straight wall 66 tangent to the outer wall 3 of the vial 1 and on the same plane as the side wall 58 of the keys 57. Each flange 65 also has a curved surface 67 extending from the edge of the straight wall 66 to the outer wall 3 of the vial 1 and conforming to the curvature of said outer wall 3. The curved flanges 65 of one vial 1 abut against the curvature of the other vial that is next to it so as to orient the two and prevent them from rolling relative to each other. The two vials 1 are placed side-by-side in the notches 61 so that they fit snugly in the notches 61. They are placed in reverse position so that the keys 57 and flanges 65 at the end of one vial are opposite the keys 57 and flanges 65 at the end of the other vial. Hence, cap end 7 of one vial will lie opposite the end cap 7 of the other vial. When the two vials 1 are placed side-by-side in notches 61 with the closed ends 5 facing in opposite directions, the flanges 57 will properly located the vials 1 in the notches 61 with respect to the rails 52 and the flanges 65 will orient the two vials with respect to each other.

It will thus be seen that the present invention provides an improved vial which is more accurate, which has a curved fluid receiving cavity and which can easily be placed accurately in a level without precision tools. The present invention also provides an improved vial which eliminates the need for an internal undercut in existing straight vials, which is more sensitive that existing vials, which may be made form harder plastic materials to resist scratching. In addition, the present invention provides an improved method of making a vial with a curved configuration. As many varied modifications of the subject matter of this invention will become apparent to those skilled in the art from the detailed description given herein above, it be understood that the present invention is limited only as provided in the claims appended hereto.

What is claimed is:

1. A method of making a vial having a cylindrical straight outer wall and a curved inner cavity comprising the steps of forming the entire outer wall in a straight cylindrical configuration, forming the entire curved inner cavity of the vial in a curve, said entire curved inner cavity and said entire outer straight cylindrical wall being formed simultaneously, the said entire curved inner cavity is simultaneously formed curved in a substantially uniform arc having an apex with opposed ends spaced from the apex and with opposed spaced sides at an angle of 90 degrees from the apex, the apex of the curved inner cavity is simultaneously formed closer to the straight cylindrical outer wall of the vial than the ends of the curved inner cavity, the said entire curved inner cavity is simultaneously formed substantially uniform in cross section throughout its length, planes tangent to the sides of the curved inner cavity are simultaneously formed parallel to each other and at right angels to a plane tangent to said apex, one end of said curved inner cavity being simultaneously formed terminating in an end wall perpendicular to said straight cylindrical outer wall, the other end of the curved inner cavity being simultaneously formed open.

2. A method as set forth in claim 1 wherein a pair of keys are simultaneously formed extending from the outer wall of said vial adjacent said open end, said keys extending in opposite directions from each other.

* * * * *